May 19, 1931. C. V. KOONS 1,806,469
SWIVEL HOOK
Filed April 16, 1930
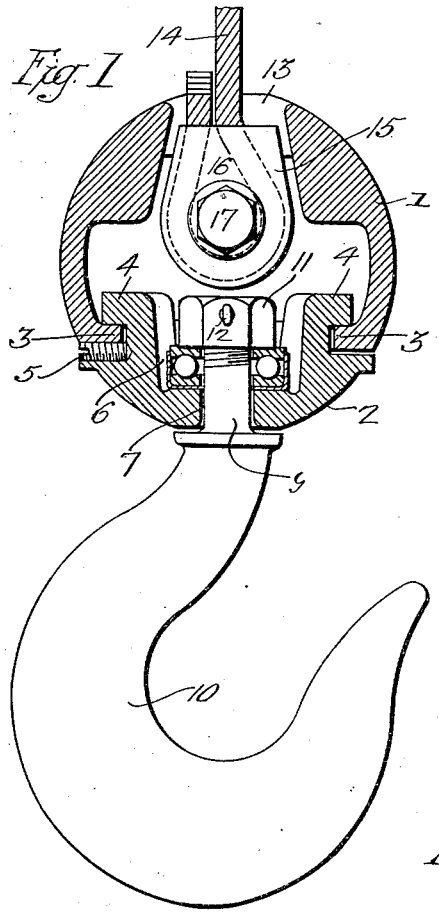
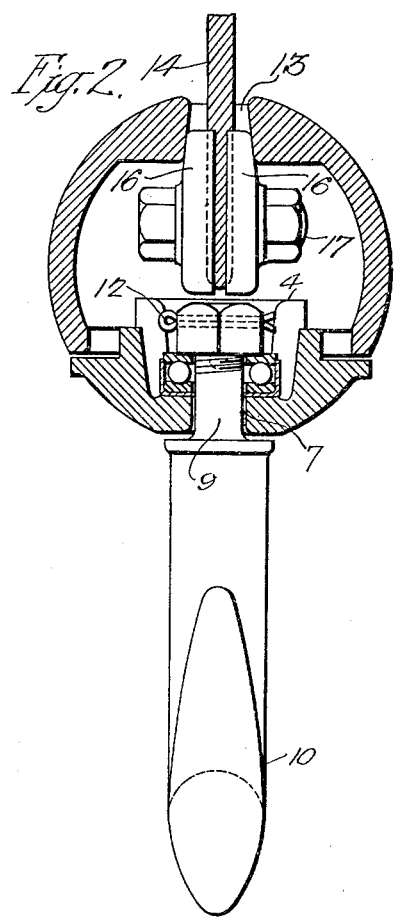
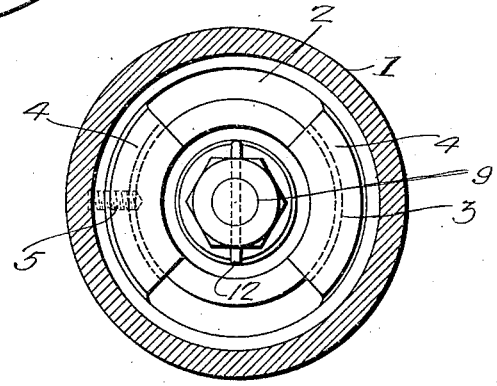
Inventor:
Charles V. Koons
by his Attorneys
Howson & Howson Patented May 19, 1931

1,806,469

UNITED STATES PATENT OFFICE

CHARLES VERNON KOONS, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

SWIVEL HOOK

Application filed April 16, 1930. Serial No. 444,855.

This invention relates to improvements in swivel hooks, and the principal object of the invention is to provide a novel swivel hook assemblage having improved characteristics as regards structural simplicity and the replacement of the various major elements.

In the attached drawings:

Figure 1 is a vertical sectional view of a swivel hook assemblage made in accordance with my invention;

Fig. 2 is a section on the line 2—2, Fig. 1, and

Fig. 3 is a section on the line 3—3, Fig. 1.

Referring to the drawings, the assemblage forming the subject-matter of the present invention comprises in a preferred embodiment a two-part housing consisting of an upper element 1 and a lower element 2. At their meeting edges, the elements 1 and 2 are provided with transversely projecting segmental flanges 3, 3 and 4, 4 respectively, these flanges being so relatively positioned and arranged as to permit insertion of the flanges of one of the elements between the flanges of the other element and an interlocking of the flanges by a subsequent partial rotation, approximately 90°, of the one element with respect to the other. Following assembly of the elements 1 and 2 as described, these parts may be held in the interlocked relation by means of a set screw 5, see Fig. 1.

As illustrated, the element 2 is provided in the interior with a central recess 6, in the bottom of which is a coaxial opening 7 extending through the wall of the said element. Around the inner end of the aperture 7, the bottom of the recess 6 forms a seat for an anti-friction bearing 8, and in assemblage the cylindrical threaded stem 9 of a hook 10 extends upwardly through the opening 7 and through the bearing 8 and is secured in the element 2 by means of a nut 11, which seats upon the bearing 8, as clearly illustrated. The nut and the stem 9 are both perforated for reception of a split or cotter pin 12. The arrangement provides for free swivelling of the hook 10 in the element 2.

The element 1 has in the top a slotted opening 13 for passage of the end of a supporting cable 14 to the looped end of which is attached a clamping member 15. The clamp 15 comprises opposed elements 16, 16, each having in its inner face a channel for reception of the cable 14 and an opening for a bolt 17, by means of which the elements 16, 16, may be clamped firmly on the cable. When so clamped, the upper slightly tapered end of the clamp 15 fits within the correspondingly tapered slotted opening 13, see Fig. 2, in wedge fashion whereby the cable 14 is anchored within the element 1. The arrangement is such that tension on the cable 14 tending to withdraw it from the element 1 creates a correspondingly strong clamping action of the elements 16, 16, against the cable.

The swivel hook assembly as described above is characterized not only by extreme simplicity of construction but also by the simplicity with which the various elements may be detached for replacement purposes. Separation of the elements 1 and 2 may be accomplished by releasing the set screw 5 and a subsequent 90° relative rotation of the said elements to disengage the interlocking flanges 3 and 4. Thereafter, the element 1 may be separated from the cable by merely releasing the bolt 17 and removing the clamp 15, while the hook 10 and bearing 8 may be removed by release of the nut 11 from the stem 9.

I claim:

1. In a swivel hook, a housing comprising separable sections, and means for detachably securing said sections together, said housing having an aperture at the top for reception of a cable and another aperture at the bottom, a hook swiveled in the bottom aperture, and means located entirely within the housing for preventing retraction from the latter both of the cable and the hook, said means being detachable to permit said retraction and being accessible for detachment by separation of the housing sections.

2. In a swivel hook, a housing comprising upper and lower separable sections, and means for detachably securing said sections together, means for attaching the upper section to a supporting cable, the said lower section being apertured, a hook having a stem loosely fitted in said aperture, and means detachably connected to said stem in the interior of the housing for preventing retraction, said hook being free to rotate in the housing about the axis of said stem.

3. In a swivel hook, a housing comprising upper and lower separable sections, and means for detachably securing said sections together, means for connecting the upper section to a supporting cable, the lower section being apertured, a hook having a stem inserted in said aperture, and means attached to the stem in the interior of said housing for preventing retraction of the stem from the latter, the inner end of said aperture terminating in a seat, and an anti-friction bearing interposed between said seat and the hook-retaining means and providing for a free rotational movement of the hook with respect to the housing about the axis of said stem.

4. In a swivel hook, a housing comprising upper and lower separable sections, and means for detachably securing said sections together, means for securing the upper section to a supporting cable, said lower section being recessed in the interior of the housing and having an aperture extending from the bottom of said recess to the exterior of the housing, a hook having a stem adapted for insertion in said aperture, and means detachably secured to the inner end of said stem for preventing retraction of the hook from the housing, and an anti-friction bearing seated in the bottom of said recess and engaged by the hook-retaining means whereby the hook is afforded a free rotational movement with respect to the housing about the axis of said stem.

CHARLES VERNON KOONS.